United States Patent

Freeman et al.

[11] Patent Number: 5,331,132
[45] Date of Patent: Jul. 19, 1994

[54] MANUFACTURE OF VISUAL LENSES

[75] Inventors: Michael H. Freeman, Denbigh, United Kingdom; Colin M. Perrott, Portola Valley, Calif.

[73] Assignee: Pilkington Diffractive Lenses Limited, St. Helens, United Kingdom

[21] Appl. No.: 955,420

[22] Filed: Oct. 2, 1992

Related U.S. Application Data

[62] Division of Ser. No. 683,036, Apr. 10, 1991.

[30] Foreign Application Priority Data

Apr. 17, 1990 [GB] United Kingdom .............. 9008580-4

[51] Int. Cl.⁵ ............................................. B23K 26/18
[52] U.S. Cl. ................................. 219/121.69; 351/161
[58] Field of Search ...................... 219/121.68, 121.69; 351/161; 264/1.4

[56] References Cited

U.S. PATENT DOCUMENTS 4,732,715  3/1988  Bawa et al. ......................... 264/1.4

FOREIGN PATENT DOCUMENTS 0343067 11/1989  European Pat. Off. .
2101764  8/1984  United Kingdom .
2129157  2/1986  United Kingdom .
2127988  3/1986  United Kingdom .
2154759  9/1987  United Kingdom .

Primary Examiner—C. L. Albritton
Attorney, Agent, or Firm—Howrey & Simon

[57] ABSTRACT

A consumable laser mask for forming a visual lens, especially a contact lens, in which at least a portion of the light passing through the lens is focussed by diffractive means. The laser mask is shaped to provide the diffractive means in the finished lens, and is made from a polymeric material with a thickness such that no residue is left at the completion of the laser ablation process. The invention also includes a method of manufacturing a lens using a consumable laser mask in accordance with the present invention.

8 Claims, 1 Drawing Sheet

U.S. Patent     July 19, 1994     5,331,132
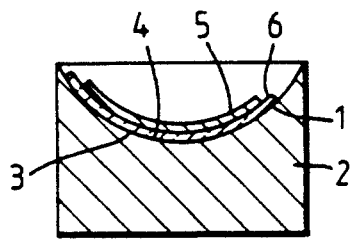
Fig. 1.
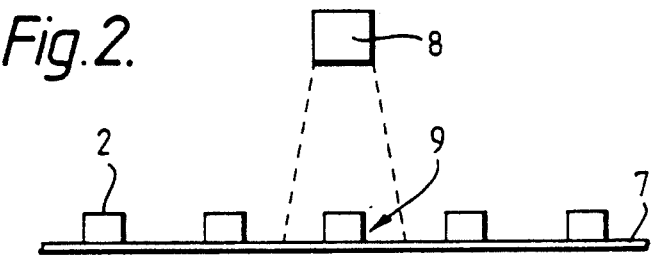
Fig. 2.
Fig. 3.     Fig. 4.     Fig. 5.
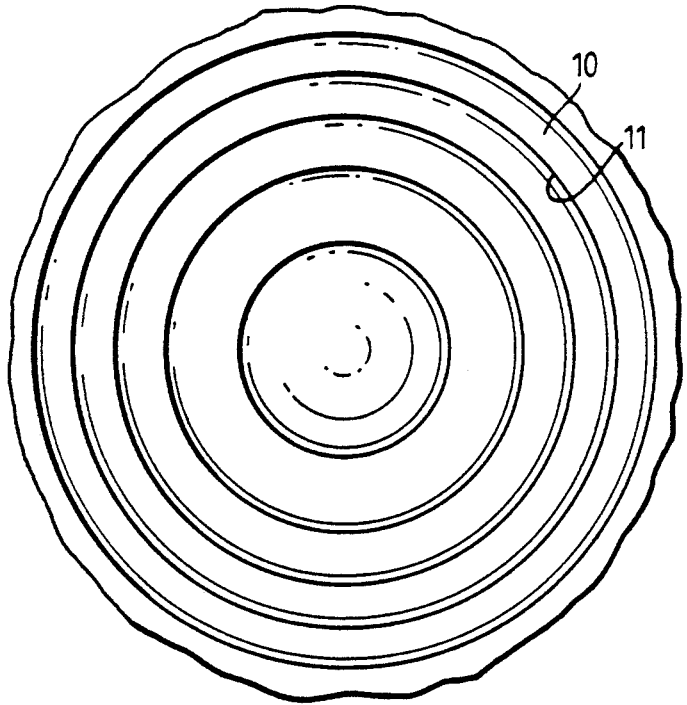  

MANUFACTURE OF VISUAL LENSES

This is a divisional application of Ser. No. 07/683,036, filed Apr. 10, 1991.

This invention relates to a consumable mask for use in the formation of visual lenses, i.e. lenses for visual purposes and especially for visual correction, particularly contact lenses, by laser ablation, and to a method of using such masks.

The use of an excimer laser for removing material from the surface of a polymeric material i.e. ablating the polymeric material is well known. In particular, the application of excimer lasers in the field of processing ophthalmic lenses of various kinds has been described in European Patent application 291,459, and in fabricating lenses from blanks in U.S. Pat. No. 4,842,782. Both of these documents describe both the use of laser light directly applied to a workpiece, and laser light applied through a mask. In this latter case the mask is designed so that it transmits the laser light to varying degrees, or only permits transmission of the laser light in a desired area, whilst blocking transmission elsewhere. These masks are made to precise configurations and are designed for repeated use, and are normally used in the removal of relatively substantial amounts of material from a lens or blank by the application of laser light. Further, in order to ensure efficient use, these masks require precise positioning relative to the article being ablated and the laser beam.

U.S. Pat. No. 4,856,613 discloses the use of laser ablation in the shaping of biological tissue, including the cornea of the eye. In the method disclosed in U.S. Pat. No. 4,856,613, an erodible lens which provides a predefined profile of resistance to the light from an excimer laser is disposed over the area of the cornea under treatment. The lens is then uniformly irradiated with a beam of radiation generated from a pulsed UV laser source and the lens eroded. Once the lens has been eroded away, the cornea surface will have been shaped in the manner dictated by the pre-defined profile of the lens.

We have found that ablation with the use of a consumable or erodible mask offers particular advantages in the manufacture of contact lenses of the kind in which at least a portion of the light reaching the eye is focussed by diffractive power or means. Ophthalmic lenses using diffractive means are described in UK Patents 2 101 764, 2 129 157, 2 127 988, 2 154 759, and European Application 343 067.

It will be appreciated by those skilled in the area of contact lenses that to produce a lens which will be comfortable to wear for a particular person a number of design factors have to be taken into account; in addition to the actual type of lens. Consequently, the following features need to be considered in the producing of a contact lens:

Does the lens have to be maintained on the eye in a particular orientation;

The back curve of the lens. Is this to be a spherical or toric curve;

What optical lens power is required.

Therefore, in order to cater for the needs of particular patients a lens manufacturer needs to be able to produce a large range of contact lenses, which differ in subtle ways in addition to the obvious change in optical power.

Further, where contact lenses are being manufactured in which at least a portion of the light passing through the lens is focussed by diffractive means, it is necessary to make such lenses with all of the above possible variations, in addition to any diffractive variations desired.

According to the present invention there is provided a consumable laser ablation mask for use in the forming of a visual lens in which at least a portion of the light passing through the lens is focussed by diffractive means, which mask is shaped to provide the diffractive means in the finished lens, the mask being made of a polymeric material and having a maximum thickness such that no residue is left at the completion of the laser ablation process.

In accordance with a second aspect of the present invention there is provided a method of making a visual lens in which at least a portion of the light passing through the lens is focussed by diffractive means, which method comprises placing a consumable mask in accordance with the first aspect of the present invention over and preferably directly on top of a visual lens blank, and exposing the lens and mask to pulses from a laser for a time sufficient to consume the mask completely.

The use of a consumable mask to apply the diffractive means in accordance with the present invention, means that the number of lenses required to be held in stock to satisfy patients' needs can be reduced. This is because the diffractive means can be easily applied to a selected lens with the other properties required for the patient as and when required. This is of particular value where diffractive means must be positioned on the lens so that when the lens is placed on or relative to the eye, the diffractive means is oriented or located in a particular manner with respect to the eye.

Consequently, a range of basic refractive only lenses can be held in stock which have the correct combinations of mechanical parameters required, and a supply of consumable masks which are of the same general configuration for any particular diffractive power. In order to facilitate this, the consumable masks are preferably made with a back surface which enables them to be directly placed on top of a lens blank which is to be modified by the imparting of diffractive means to form the final lens.

In use, it is essential that the diffractive means imparted to the lens blank to form the finished lens has a well defined profile. Therefore, preferably, the consumable mask is in contact with the lens. The mask may be manufactured from any suitable polymeric material, and in a preferred embodiment of the present invention the mask is manufactured from a material which is non-transparent to visible light.

Alternatively, the material of the mask may be transparent with respect to visible light.

Any suitable form of laser light/radiation may be used in accordance with the present invention. In a preferred arrangement of the present invention the laser light/radiation used in the method in accordance with the second aspect of the present invention is emitted by an excimer laser, and is generated as a pulsed ultra-violet source.

The mask and any exposed lens blank material are exposed to, and consumed by, pulses of laser radiation for a time sufficient to ensure that the pattern on the mask is imparted to the lens.

An advantage of the use of consumable masks is that there can be almost continuous use of the laser without the need for complex adjustments of the laser when the type of lens being manufactured changes. The laser can be simply set to operate at a particular pulse rate, and the mask and lens to be formed passed into the beam of the laser for the required time while mounted together on a carrier.

In accordance with a preferred arrangement of the present invention the invention also includes a method of making a visual lens in which at least a portion of the light passing through the lens is focussed by diffractive power, which comprises placing a consumable mask as described above directly on top of a lens preform and exposing lens and mask to pulses of excimer laser radiation for a time sufficient to ablate the consumable mask.

The masks can be made without any particular orientation of the diffractive means with respect to the back surface of the lens, and can e.g. be made in large volumes by a casting process. The masks need not be as strong as a visual lens and they do not need to stand more than one handling.

However a finished visual lens can also provide a satisfactory sacrificial mask. The use of a finished lens may be economical where the final lens must be made by machining a blank once the orientation on or relative to the user's eye has been determined.

Another possible use of the present invention is in producing a lens which uses diffractive means to emulate a cylindrical lens or a toric lens using so-called crossed-cylinders. Such lenses are described in European Application 89313132.6. It is necessary in this latter case to apply two patterns to the prescribed lens, and to orient these at a pre-determined angle with respect to one another. This can be conveniently done by using two masks or two finished lenses, one after the other.

In a preferred arrangement of the present invention the mask is made of the same material as the lens blank being treated so that their ablation characteristics are identical. However in some cases it may be simpler and more economical e.g. to make the mask of another polymeric material with substantially the same ablation characteristics. Cole has disclosed in his paper "Dependence of photo-etching rates of polymers at 193 nm on Optical Absorption Coefficients" Vol. 48 Applied Physics Letters, a range of polymers which can be ablated using a pulsed ArF excimer laser at 193 nm.

In the case of lenses made of materials which are used in a hydrated state, the ablation may be carried out prior to hydration using a consumable mask or sacrificial lens in the xerogel state, or both the consumable mask and sacrificial lens can be in the hydrated state when they are made from an appropriate polymeric material.

Further, the mask can be provided with markings to enable it to be correctly oriented on a lens blank to be ablated. In some cases it may even be desirable to print on the lens a pattern detailing the region and orientation of the diffractive pattern on the lens and its overall configuration.

The use of an excimer laser operating at ultra-violet wavelengths means that the mechanism of ablation is photo-chemical i.e. the direct breakdown of intra-molecular bonds. This means that the polymer surface is removed without significant damage to the surface left in place, at least with the quantities of material removed when forming a lens with diffractive means.

The consumable mask is made of a material which can be ablated using an excimer laser. The examples of European Specification 291459 describe the use of such an excimer laser in the shaping and marking of contact lenses.

A minimum laser irradiance level is essential for ablation, however preferably this level is not greatly exceeded.

The pulse repetition rate for the laser may be chosen to meet the needs of each particular application. Normally, the rate will be between 1 and 500 pulses per second, preferably between 1 and 100 pulses per second.

Suitable irradiation intensities vary depending on the wavelength of the laser, and the nature of the object to be irradiated. For any given wavelength of laser energy applied to any given material, there will typically be a threshold value of the energy density below which material is removed too slowly. Above the threshold density, there will be a range of energy density over which increasing energy densities give increasing removal of material, until a saturation value is reached. For increases in energy density above the saturation value, no significant increase in ablation of material occurs.

The threshold value and the saturation value will vary from wavelength to wavelength of laser energy and from material to material to be shaped. However, for any particular laser and any particular material, the values can be found readily by experiment. For example, in the case of where a consumable mask and the underlying lens is exposed to a wavelength 193 nm (the wavelength obtained from an ArF excimer laser), the threshold value is about 50 mJ per $cm^2$ per pulse, and the saturation value is about 250 mJ per $cm^2$ per pulse. There appears to be little benefit in exceeding the saturation value by more than a small factor, and suitable energy densities at the lens surface are 50 mJ per $cm^2$ to one J per $cm^2$ per pulse for a wavelength of 193 nm.

The threshold can vary very rapidly with wavelength, and at 157 nm, which is the wavelength obtained from a $F_2$ laser, the threshold is about 5 mJ per $cm^2$ per pulse. At this wavelength suitable energy densities at the surface are 5 mJ per $cm^2$ to one J per $cm^2$ per pulse.

The laser system is normally used to provide an energy density at the surface to be ablated at a value slightly less than the saturation value. Thus, when ablating a lens blank with a wavelength of 193 nm (under which conditions the saturation value of 250 mJ per $cm^2$ per pulse), it is preferable to provide to the consumable mask and lens pulses of an energy density single pulse which will erode a depth in the range 0.1 to 1 micrometer of material from the lens blank.

The invention is particularly useful where the visual lens is a contact lens but could be applied to other forms of lens for visual, and especially visual correction purposes, e.g. intra-ocular lenses.

The invention will now be described by way of example with reference to the attached drawings in which:

FIG. 1 illustrates diagrammatically a system of mounting lenses and consumable masks to carry out ablation;

FIG. 2 illustrates diagrammatically a method for feeding the lens and mask combination past an excimer laser;

FIG. 3 illustrates diagrammatically in plan a laser mask for use in the production of a contact lens made in accordance with a method in accordance with the present invention;

FIG. 4 illustrates a side view of a first mask as shown in FIG. 3; and

FIG. 5 illustrates a side view of a second mask as shown in FIG. 3.

Now referring to FIG. 1 of the accompanying drawings there is shown a contact lens 1 mounted in a shaped support member 2 having a concave supporting surface 4, so that the convex surface 3 of the contact lens 1 is in contact with said supporting surface.

The (unnumbered) back surface of a laser mask 5 is placed in the appropriate position over the concave surface 6 of the contact lens 1, with the pattern to be transferred to the concave surface 6 of the contact lens 1 being on the concave pattern surface of the laser mask 5.

The laser mask 5 is manufactured from a material which is non-transparent with respect to the laser light emitted by the particular laser being used.

In order to impart the pattern from the mask 5 to the concave surface 6 of the contact lens the contact lens is exposed to the influences of a laser, such as an excimer laser operating from a pulsed ultra-violet source. The contact lens surface 6, and the laser mask 5 are consumed, and when the mask 5 has been completely consumed the desired pattern will have been imparted to the concave surface 6 of the contact lens 1.

However, should the contact lens 1 be over exposed to the laser equal amounts of the contact lens material in the treated area are removed. Therefore, no material ill effects result in the finished contact lens.

The use of the laser mask 5 and excimer laser in the above mentioned outline method can be used to impart a relief kineform diffractive means to a contact lens 1.

Now referring to FIG. 2 of the accompanying drawings there is shown a schematic representation of apparatus for feeding the shaped support member 2, contact lens 1 and laser mask 5 arrangement shown in FIG. 1 through a laser arrangement. The shaped support member 2, lens 1 and mask 5 are placed on a conveyor belt 7 and conveyed through to a station position 9 where the conveyor belt is stopped and the contact lens is exposed to a laser 8 of the laser arrangement.

In an alternative arrangement a carousel arrangement may be used which can be indexed round to present the lens/mask combination to the laser beam for the time required to irradiate the combination with the necessary sequence of pulses to ablate the consumable mask and transfer the diffraction pattern to the concave surface of the lens.

The laser 8 is set up so that it emits approximately 100 pulses per second. Each pulse of light is of a wavelength of around 193 nm and is energy wise slightly above the threshold value for the consumption of the mask 5 material and the material of the lens blank. This will mean that each pulse has an energy value above 50 ml per cm².

The energy value is actually set so that it provides a consumption of the material of the mask 5 and the material of the lens blank which erodes the materials at the rate of 0.1 to 1 micrometers per pulse.

Now referring to FIG. 3 of the accompanying drawings, there is shown a typical example in plan view of a mask 5 for use in the production of a contact lens in accordance with the method of the present invention as detailed above.

The laser mask 5 is provided with a series of concentric rings 10 which has a predetermined height of step 11 therebetween. The use of this type of laser mask 5, when the mask is manufactured from either the same material as the lens blank or a material of similar properties with regard to the laser ablation, will cause a similarly shaped pattern to be imparted to the surface 6 of the lens blank.

Now referring to FIGS. 4 and 5 of the accompanying drawings, there is shown sectioned side views of two laser masks of identical plan view as shown in FIG. 3.

The mask shown in FIG. 5 is for use in the situation where the surface 6 of the lens blank is convex in profile. The curvature of the mask is selected so that it matches the curvature of the lens blank.

Now referring to FIG. 4 there is shown a side view of a laser mask for use with regard to a lens blank having a plano surface to which the pattern is to be imparted.

The consumable mask is preferably placed directly on top of and in contact with the lens blank so that as the mask is ablated the lens blank is eroded in accordance with the pattern on the mask.

What I claim is:

1. A method of making contact lenses and intra-ocular lenses in which at least a portion of the light passing through the lens is focussed by diffractive means, which method comprises placing the back surface of a consumable mask directly in contact with the lens, the mask having a pattern surface shaped to provide the diffractive means in the finished lens, and exposing the lens and mask to pulses from a laser for a time sufficient to ablate the consumable mask so that as the mask is ablated the lens is eroded in accordance with the pattern on the mask pattern surface.

2. A method as claimed in claim 1, wherein the laser light/radiation used is emitted by an excimer laser, and is generated as a pulsed ultra-violet source.

3. A method as claimed in claim 2, wherein the laser light is pulsed at a rate between 1 and 500 pulses per second.

4. A method as claimed in claim 2, wherein the laser light is pulsed at a rate between 1 and 100 pulses per second.

5. A method as claimed in claim 2, wherein when ablating there is provided to the consumable mask and lens pulses of an energy density single pulse which will erode a depth in the range 0.1 to 1 micrometer of material from the lens.

6. A method as claimed in claim 1 in which the lens produced is one in which the configuration of the diffractive means is such that a lens results which emulates a cylindrical lens.

7. A method as claimed in claim 1 in which the lens produced is one in which the configuration of the diffractive means is such that a lens results which emulates a toric lens.

8. A method as claimed in claim 1 wherein the mask is oriented on the lens by mask markings.

* * * * *